March 11, 1952 J. F. KANE 2,588,846
COMBINATION COOKING DEVICE
Filed Sept. 4, 1947 8 Sheets-Sheet 1

Inventor
JOSEPH F. KANE

By The Firm of Charles W. Hills
Attys.

March 11, 1952

J. F. KANE 2,588,846

COMBINATION COOKING DEVICE

Filed Sept. 4, 1947

Inventor
JOSEPH F. KANE
by The Firm of Charles W. Hills Attys.

March 11, 1952 J. F. KANE 2,588,846
COMBINATION COOKING DEVICE
Filed Sept. 4, 1947 8 Sheets-Sheet 7

Inventor
JOSEPH F. KANE
By The Firm of Charles W Hills Attys.

March 11, 1952 — J. F. KANE — 2,588,846
COMBINATION COOKING DEVICE
Filed Sept. 4, 1947 — 8 Sheets-Sheet 8

Fig. 11

Inventor
JOSEPH F. KANE

By The Firm of Charles W. Hills
Attys.

Patented Mar. 11, 1952

2,588,846

UNITED STATES PATENT OFFICE 2,588,846

COMBINATION COOKING DEVICE

Joseph F. Kane, Evanston, Ill.

Application September 4, 1947, Serial No. 772,027

3 Claims. (Cl. 99—423)

The present invention relates to a combination cooking device and more particularly to such a device that is highly desirable for the toasting of slices of bread consecutively and automatically and for continuously making pancakes by virtue of a cooking cycle of predetermined length and intensity of heat, although the invention will have other uses and purposes as will be apparent to one skilled in the art.

The great majority of busy restaurants and cafeterias have need of a constant supply of toast and pancakes during the breakfast period and an even greater supply of toast during the lunch and dinner hours. However, it is common practice for the cooks or attendants to stop their other activities and make pancakes or insert bread in the toasters as each order is filled. Making pancakes in this way not only requires that the batter be poured on the griddle but also requires that the attendant remain at hand to prevent burning of the pancake. Obviously, much time can be saved and more uniform toast and pancakes can be produced if these operations were made completely automatic.

Further, the combination automatic toaster and pancake maker of this invention will find ready acceptance in the home. By use of this cooking unit the housewife can take her place at the table after filling the bowl with batter or inserting the necessary number of slices of bread in the machine. Pancakes or toast, as the case may be will be automatically cooked with no further attention from the housewife.

With this in mind it is an important object of this invention to provide a cooking apparatus in which the toasting of bread or making the pancakes may be efficiently and automatically carried out without requiring the attention of an operator.

Another object of this invention is to provide a cooking apparatus in which a predetermined metered amount of batter is automatically directed into the pancake mould, thus assuring uniformity of the finished pancake.

A further object of this invention is to provide a combination toaster and pancake maker which is small and compact and readily movable from place to place.

A still further object of this invention is to provide a combination toaster and pancake maker in which each part of the toast or pancake is successively subjected to a uniform heat so that each consecutive article is uniformly cooked and no part of any article is overcooked or burned.

Another and further object of this invention is the provision of a combination toaster and pancake maker the parts of which are easily disassembled for cleaning.

According to the general features of this invention there is provided a plurality of griddles for receiving pancake batter which are rotatably supported on a base member between a pair of heater elements. Each griddle receives a metered quantity of batter at a griddle filling station and is swung about the axis of the support member between the heater elements to a discharge station where the griddle is bodily revolved by cam action about a horizontal axis to discharge the pancake therefrom. After discharging the pancake, the revolution of the griddle is continued until it returns to its initial position.

By substituting a pusher plate for the griddle an efficient toaster can be obtained. The pusher plate is provided with spaced apertures arranged to slide one slice of bread from a stack of sliced bread and move it in a circular path over a heater element to discharge it after a predetermined time at a discharge station.

A special feature of this invention resides in the provision of a cam member having a threaded portion for revolving the griddle to discharge a pancake or the like.

Another important feature of this invention is the provision of the heating element so disposed that every part of the bread or pancake is successively and uniformly cooked, so that each part is thoroughly cooked and no part overcooked.

Other objects, features and advantages of the present invention will be apparent to one skilled in the art from the following detailed description taken in connection with the accompanying drawings.

Figure 1:
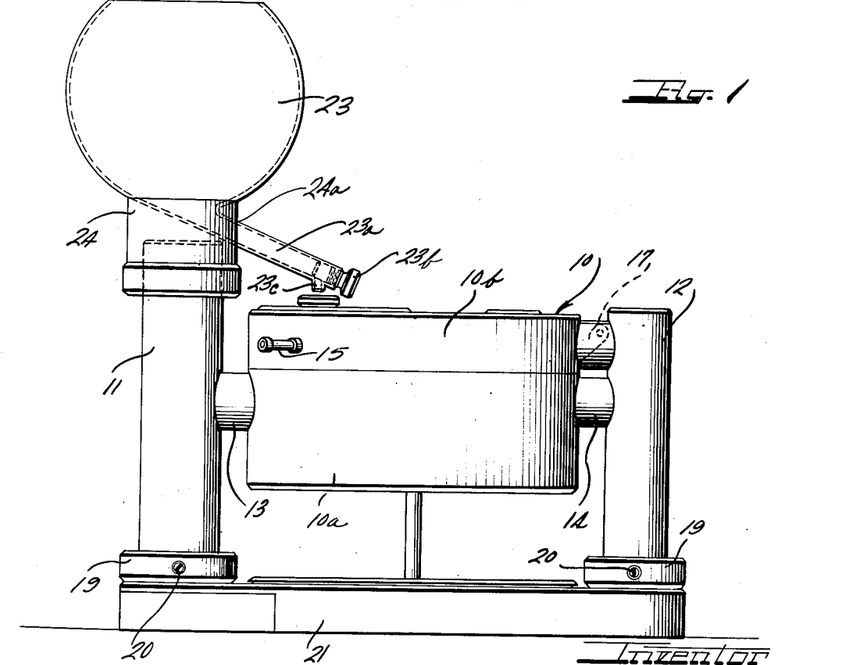
Figure 1 is a front elevational view of a combination cooking device in the form of a toaster and pancake maker embodying principles of this invention, showing a supply bowl for delivering pancake batter to the unit when used as a pancake maker.
Figure 2:
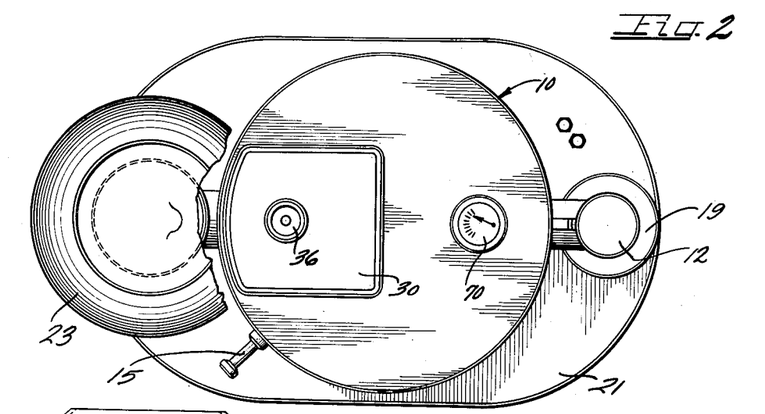
Figure 2 is a plan view partly broken away of the cooking device of Figure 1.

In Figure 1 is illustrated the assembled pancake making apparatus of this invention. Reference number 10 represents the cooking unit comprising a base portion 10a supported between two upright posts 11 and 12 by means of arms 13 and 14. A cover member 10b, having a lifting handle 15, is pivotally mounted on the post 12 by means of a hinge 17 and is arranged to tightly close the open top of the base 10a. The posts 11 and 12 may be suitably made of steel tubing and are secured to socket members 19 of a platform 21 by a plurality of set screws 20.

A supply bowl 23 is fastened to a hollow stand 24 which rests freely on the post 11. Thus the bowl and the stand may be rotated on the post 11 to permit opening of the cover member 10b. The bowl 23 and the stand 24 may conveniently be removed as a unit and the stand will serve as a holder for the bowl 23 when it is not being used. Pancake batter in the bowl is delivered to the cooking unit through a discharge tube 23a which extends through an opening 24a in the stand 24. At its lower end a metering valve 23b is threaded into the tube 23a, being arranged to limit the flow of batter from a discharge nozzle 23c. The tube 23a preferably has a straight bore for ease in cleaning.

Figure 4:
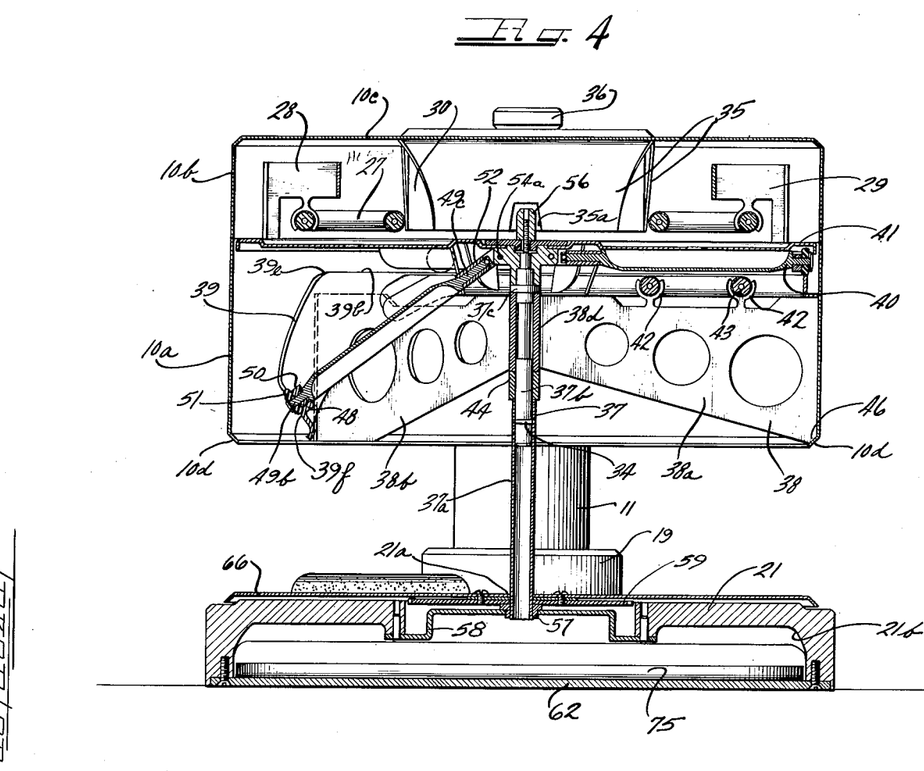
Figure 4 is a vertical sectional view taken on line IV—IV of Figure 3.
Figures 6, 7, 8:
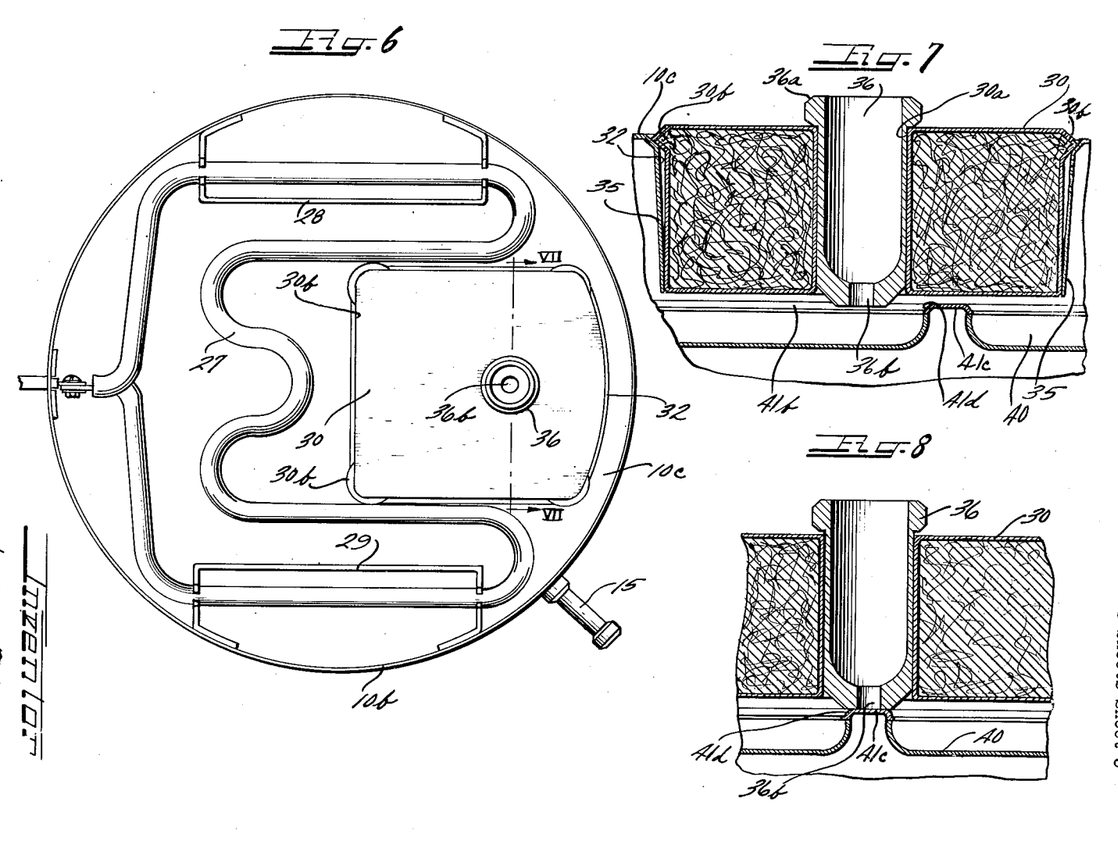
Figure 6 is a plan view of the underside of the cover member of the cooking unit.
Figure 7 is a fragmentary vertical sectional view taken on line VII—VII of Figure 6.
Figure 8 is a fragmentary vertical sectional view similar to that of Figure 7 but showing the closed position of the filler unit.

The cover 10b, Figures 4 and 6, is essentially a cylindrical member having a closed top and an open bottom. Supported substantially parallel to the top plate 10c of the cover member, as by means of a pair of brackets 28 and 29 which are secured to the inner wall of the cover 10b, is an electric heating element 27. An adapter member 30, Figure 7, having a central opening 30a, is supported in an opening 32 in the top plate of the cover member 10b by means of an enlarged rim portion 30b formed integrally with the adapter 30 and arranged to overlie the edge of the opening 32. When supported in the opening 32, the adapter 30 contacts at its lower end the sides of four guide members 35 which are cut out of the top plate of the cover member and bent downwardly as shown in Figure 7. These slanted guide members tend to hold the adapter 30 in place. It is to be noted in Figure 4, that one of the guide members projects downwardly at approximately the axis of the machine end, therefore, a cutout portion 35a is provided in that member to clear a lock nut located therebeneath.

A cup-like container 36 is arranged to be supported by a flange 36a in the opening 30a of the member 30. The container 36 has a restricted orifice 36b at its lower end extending below the lower edge of the adapter 30. This container serves to direct the pancake batter into the griddle as will be explained hereinafter.

The base portion 10a of the cooking unit, Figure 4, is a cylindrical member entirely open at the top and at the bottom except for a slanted annular ring portion 10d. Disposed inside the base 10a and mounted for pivoting about a central drive shaft 37 is a spider member 38, a cam 39, an assembly of griddles 40 and a metering plate 41, positioned above each other in the order named. The spider member 38 and the cam 39 are stationary while the griddle assembly and the metering plate are secured for rotation on the drive shaft 37. It is to be noted that the metering plate 41 lies between the heating element 27 and the batter in the griddle assembly 40 and therefore acts as a top griddle plate.

Figure 11:
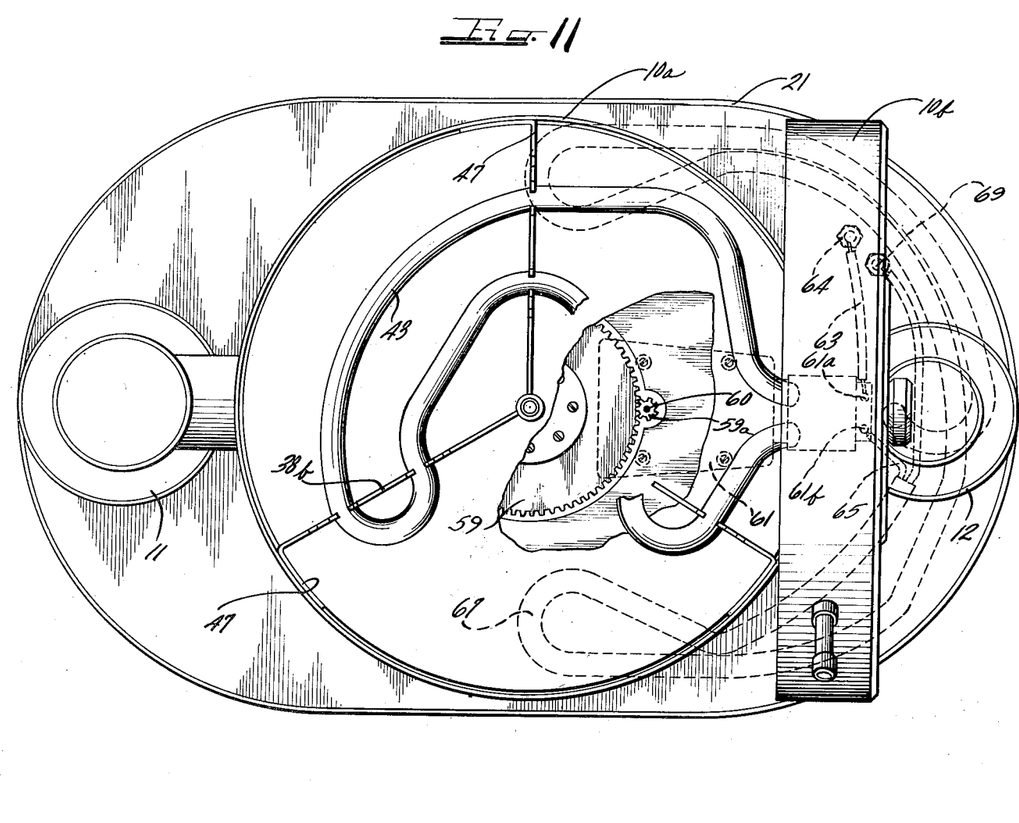
Figure 11 is a plan view similar to Figure 10 but showing the cover member swung into an open position, and the plate ordinarily disposed therebeneath removed to more clearly illustrate the lower structure of the device.

The spider member 38 comprises three arms, 38a, 38b and 38c, spaced radially around the shaft and secured to a hub member 38d. A spacer sleeve 44 is supported by a lower tubular portion 37a, of the drive shaft 37. A plurality of U-shaped supporting members 42 project upwardly above the arms of the spider member 38 to receive an electric heating element 43 which, as shown in Figure 11, receives energy from a feeder cable located in the post 12.

The spider 38 is supported by a beveled portion 46 at the extreme end of each arm. This beveled portion rests on the annular rim 10d of the base 10a. The spider member 38 also serves to center the base 10a since the outer portion of the guide arms 38a, 38b and 38c have portions 47, Figure 3, bent substantially perpendicular to the arms to lie close against the inner wall of the base.

Figures 3, 12:
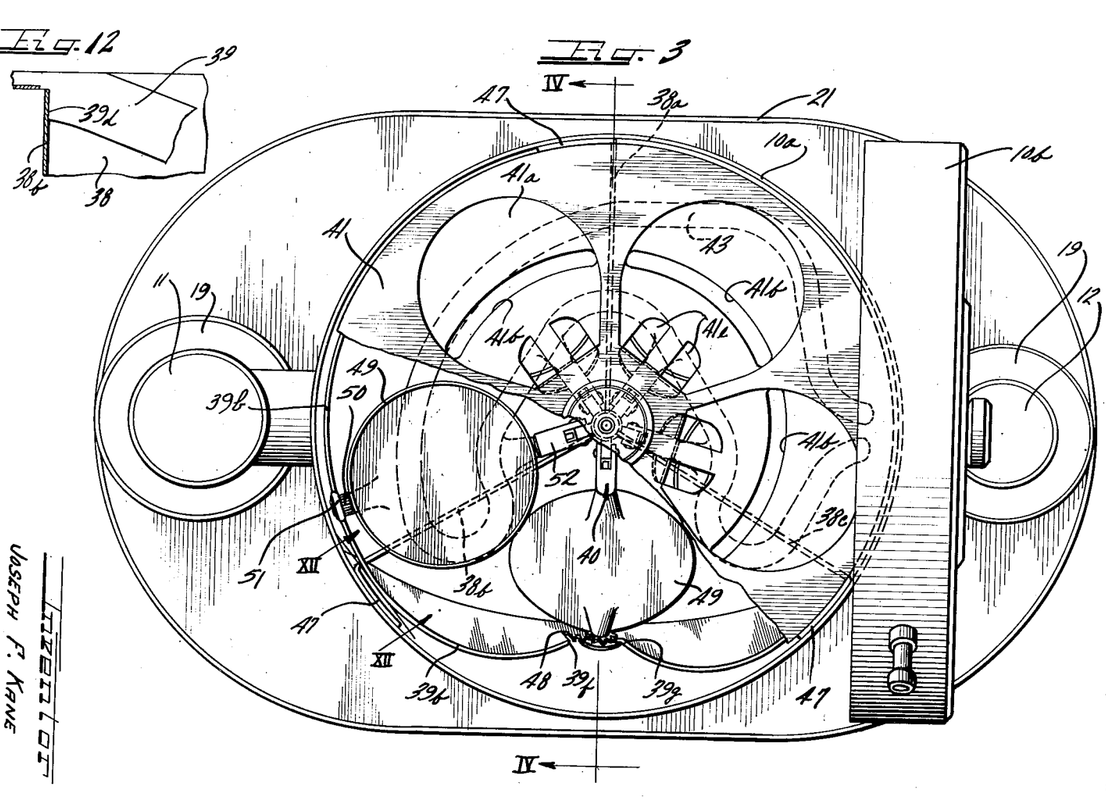
Figure 3 is a plan view of the structure of Figures 1 and 2, showing the cover swung into an open position and showing parts removed and broken away to more clearly illustrate the structure.
Figure 12 is a fragmentary, vertical sectional view taken on line XII–XII of Figure 3.
Figure 5:
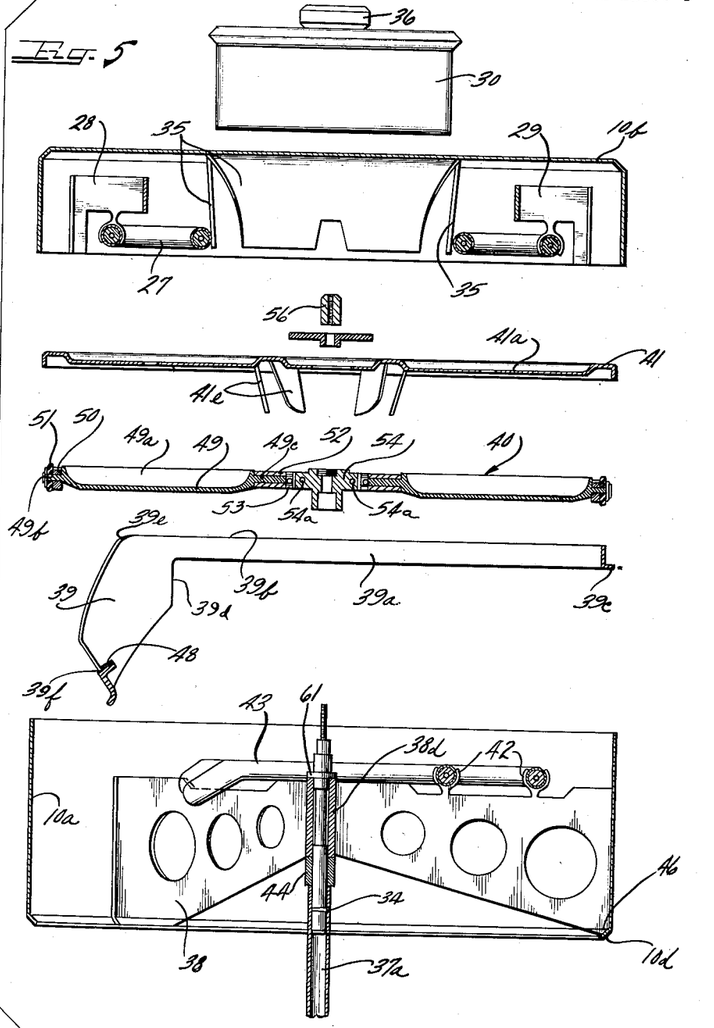
Figure 5 is an exploded vertical sectional view similar to Figure 4 but showing the hinged cover member disposed directly above the base instead of in hinged relation in order to illustrate the arrangement of the component parts of the unit and particularly illustrating the ease of disassembly for cleaning.

The cam 39, Figures 4 and 5, is of a generally circular form having an upstanding wall portion 39a. The upper surface 39b forms the camming surface. A circular rim portion 39c extends outwardly from the wall 39a around a large portion of the periphery of the cam wall and is arranged for close fitting contact with the side walls of the base 10a. Since the cam 39 is merely a shell, the contact of the rim 39c with the side walls centers the cam therein. As shown in Figures 5 and 12, the lower edge of the wall 39a has two substantial vertical marginal portions 39d, one of which is adapted to abut each of the guide arms 38b and 38c of the spider 38 and thus prevent rotation of the cam.

For approximately three-quarters of its periphery, Figure 4, the camming surface 39b is disposed substantially horizontally. However, at a point 39e the surface begins to descend to a low point 39f at the junction of the camming surface and a portion of a rack 48, offset inwardly from the camming surface. The rack 48 which is formed integral with the cam, extends only a short distance, to a point 39g, Fig. 3, where the camming surface begins again and proceeds up an incline to its substantially horizontal position.

The assembly of griddles 40 comprises a plurality of griddles 49 each having a recessed pancake batter receiving portion 49a, a gear member 50, Figure 5, and a roller 51. The roller is pivotally mounted on a projection 49b of the griddle adjacent the gear 50 which is formed integral with or otherwise rigidly secured on the projection 49b. The griddle 49 has an inner arm 49c which is pivotally mounted in a sleeve 52, being held therein by a collar 53 pinned to the end of the arm 49c. Sleeve 52 is mounted for pivoting substantially vertically on a pin 54a in a hub member 54 which is disposed about the drive shaft 37. Each griddle is guided in its vertical pivoting movement by a pair of downwardly extending tabs 41e, Fig. 5, bent downwardly from the metering plate 41.

As the griddle assembly is rotated by the drive shaft 37, the roller 51 of each griddle rides on the camming surface 39b with the griddle in a substantially horizontal position and the recessed portion 49a opening upwardly. As the roller 51 progresses around the cam, it rides down the slanted portion of the camming surface to the low point 39f, where the surface ends. At this point the gear 50 moves into mesh with the rack 48 and begins to rotate the griddle. There are sufficient teeth on the rack to rotate the griddle through one complete revolution, returning it to its original horizontal position by the time the camming surface begins again and guides the griddle up the slanted surface to its original horizontal position.

It is evident that, if pancake batter is distributed into the griddle 49 and the griddle is rotated between the electrical heating units 43 and 27 at a predetermined rate of speed, the pancake will be properly cooked by the time the griddle reaches the low point 39e and will then drop out of the griddle when it is rotated about its own axis through approximately 180°.

In order that only a certain, advantageous amount of batter be admitted to the griddle, a metering plate and upper griddle 41 is disposed on the drive shaft 37. Both the griddle assembly and the metering plate 41 are secured to the drive shaft 37 by means of a nut 56 which is threaded on the end of the shaft 37.

The metering plate 41 is a circular member having a plurality of recessed portions 41a, Fig. 3. Disposed in each of these recessed portions is an arcuate slot 41b which extends through the plate and provides means for pouring batter into the griddle which is disposed directly under the recessed portion.

The arcuate slot 41b is disposed at the same distance from the axis of rotation of the drive shaft as is the orifice 36b of the container 36. Therefore, when the cover 10b is swung down into place, the orifice 36b extends into the slots 41b, as shown in Figure 7. As the metering plate 41 is rotated, batter will be distributed to the griddle from the container 36, until the raised portion 41c of the plate 41, between the adjacent recessed portions, passes under the orifice 36b. Each recess has a beveled upper edge 41d which forces the container 36 upwardly as it passes therebeneath to cover the orifice, Figure 8, and stop the flow of batter.

Thus, in this invention, there is provided a plurality of griddles each of which is arranged to receive a metered amount of pancake batter as it passes beneath a container. The griddles are guided on a camming surface which directs them between heating elements to a discharge station where the pancake is automatically discharged by bodily rotating the griddle.

The drive shaft 37 comprises a lower tubular portion 37a and an upper shaft portion 37b pinned together by the tapered pin 34. Near the upper end of the shaft 37 a shoulder 37c is supported on the hub 38d of the spider member 38 and near the lower end, the shaft 37 extends into an opening 21a in the platform 21 and is journalled for rotation in a bearing 57 which is supported by a bracket 58 pinned to the underside of the platform 21 in the hollow base portions 21b of the platform 21. A gear 59 is suitably secured, as by welding, to the lower end of the shaft 37 just above the bearing 57. This gear is driven by a gear 59a secured to the drive shaft 60 of an electric motor drive unit 61 which is supported by a bottom closure plate 62, Figures 4 and 9, fastened across the open bottom of the platform 21 and receives its power from the conductor 63 leading from the terminal 64, Figure 11.

A rotating table member 66 is disposed about the shaft 37 secured by cap screws to the gear 59. Thus, the table 66 rotates with the gear and moves the pancake away from the discharge station.

Figure 9:
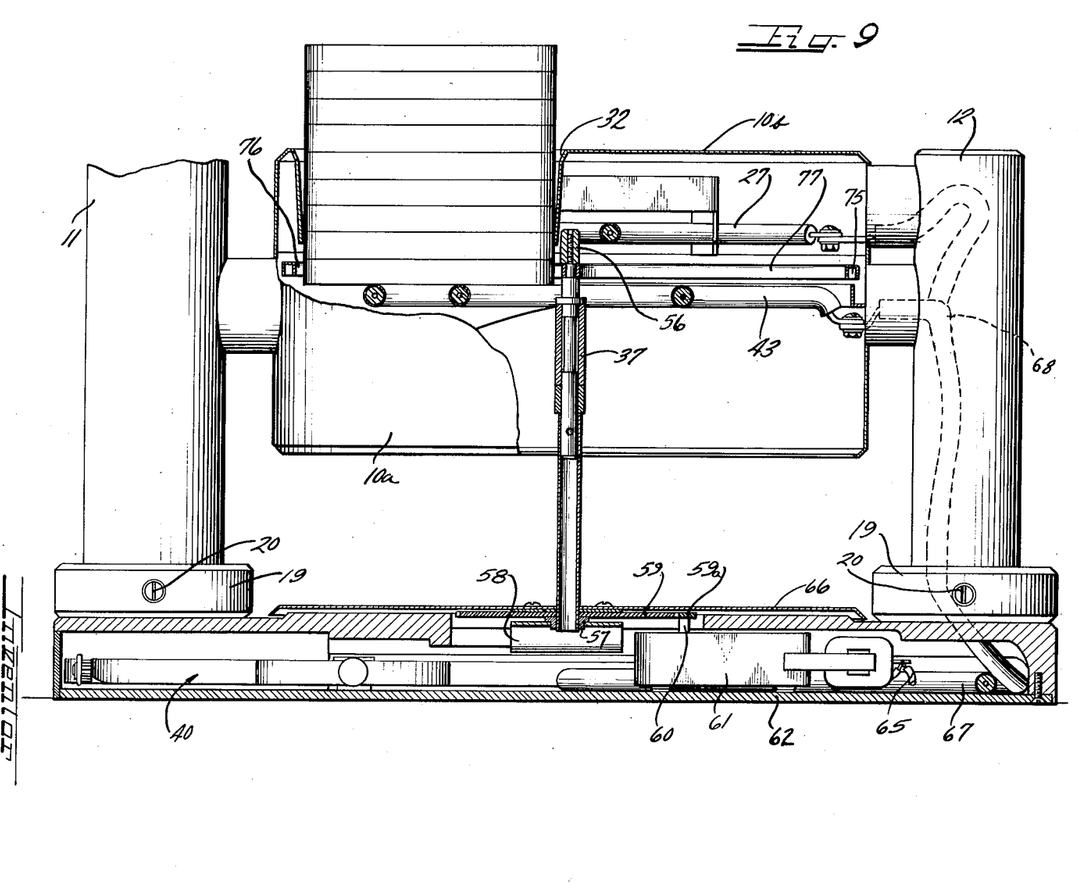
Figure 9 is a front elevational view, partly broken away and partly in section, of the cooking device as arranged when being used as a toaster.

The electric circuit of this invention may be traced in Figures 9 and 11 from a terminal 64, through a conductor 63, the terminals 61a and 61b of the motor unit 61, the conductor 65, to the heater cord 67. The cord 67 is preferably made extra long to prevent transmission of heat to the motor unit 61. The cord extends vertically upwardly in the post 12 to a junction point 68 where leads are taken off to the heating elements 43 and 27. The circuit is of course completed through the heating elements and the cord 67 back to the terminal 69. Near the upper end of the post 12 the flexible cord 67 is provided with a loop of excess cord to allow the cover 10b to be opened.

A dial-type thermometer 70 may be disposed in the top plate of the cover 10b to record the temperature inside the cooking unit. A thermostat may conveniently be incorporated in the thermometer unit and in the electrical circuit to de-energize the heating elements 43 and 27 when a predetermined temperature is reached.

In Figure 9 the cooking device is shown assembled for use as an automatic toaster. It will be noted in Figures 9 and 10 that the spider member 38 carrying the heating element 43 is positioned as before in the base portion of the cooking unit while the cam member 39 has been revolved to a position approximately 120° removed from its former position, so that the inwardly disposed ratchet portion of the cam will not interfere with the discharging of the toast between the ends of the heating elements. It is further to be noted that the griddle assembly 40 has been removed as has been the metering plate 41. In place of these elements a pusher plate 75 is secured for rotation on the shaft 37 by means of the lock nut 56. The adapter member 30 with the pancake batter container 23 is removed from its position in the opening 32 in the cover. The opening 32 is now used to receive a loaf of sliced bread as clearly illustrated in Figure 9. The pusher plate 75 contains two oppositely disposed apertures 76 and 77 which have a configuration to approximate the shape of a slice of bread. As this pusher plate is revolved by the shaft 37, which is driven from the electrical motor unit 61, one of these apertures will be moved under the loaf of bread and a slice of the bread will drop into the aperture and will rest on the heating element 43 therebelow. As the pusher plate continues its rotation this slice of bread will be slid from under the stack and will be rotated over the heater element through substantially 270° until it is discharged at the end of the heater element.

Figure 10:
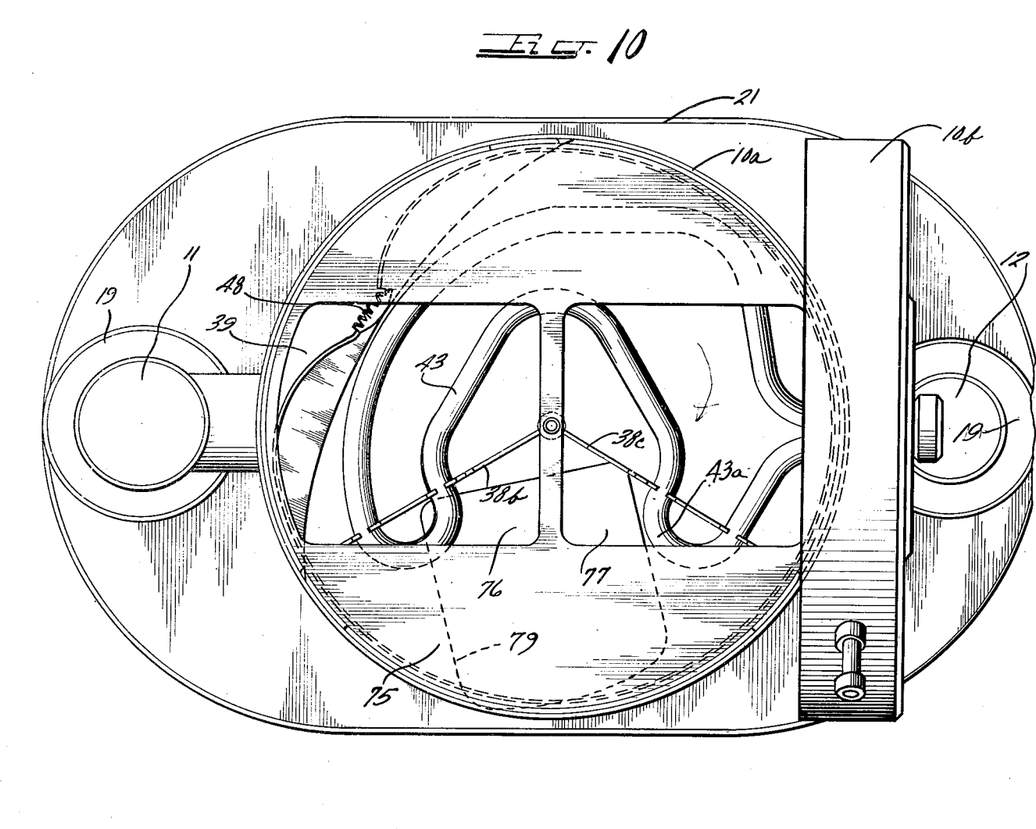
Figure 10 is a plan view of the arrangement of Figure 9 showing the cover swung into an open position.

In Figure 10 the relative position of the elements of the toaster is illustrated. There is also shown a piece of toast 79 which has been slid off the end of the heater element 43. The discharge station for toast is thus defined by the open space between the ends of the element 43. It will be understood, of course, that to facilitate the discharge of toast at this station the discharge end 43a of the heater element 43 may be slanted downwardly, while the portion of the heater element 27 disposed immediately thereabove may be slanted upwardly to provide clearance for the slice of toast as it is discharged.

It is to be noted that the bread is automatically toasted on both sides simultaneously due to the fact that there is a heater element 27 in the cover member. Each aperture 76 and 77 automatically slides one slice of bread from the stack of bread and rotates it between the elements to its discharge position. Thus it is seen that there is provided means for automatically toasting all the slices of bread from a stack of bread in a continuous and uninterrupted manner.

A particular feature of this invention is the arrangement of the heating elements 27 and 43 each of which as is clearly seen in Figures 6 and 10 has a special shape that causes every part of the slice of bread or pancake to be subjected to the heating elements as it progresses around the unit. Different parts of the elements are at different distances from the center of rotation and therefore no part of the article being cooked is subjected to a continuous intensive heating and the article is evenly cooked with no danger of burning in any portion.

Figure 9 shows plainly that the griddle assembly 40 can be stored in the hollow chamber in the bottom of the platform 21 while the unit is being used as a toaster and likewise, as shown in Figure 4, the pusher plate 75 may be stored in the hollow portion 21b of the platform 21 when the unit is being used as a pancake maker.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In an apparatus for continuously making pancakes, a metering device comprising a supply container having a discharge orifice at the bottom thereof, a plurality of griddles arranged for moving below said container to receive pancake batter therefrom and a plate movable with said griddles in sliding contact with the bottom of said container and having a plurality of openings of limited extent movable directly under the orifice, whereby pancake batter will be delivered to one of said griddles when an opening is aligned with the orifice and will be held in said container at all other times.

2. In an apparatus for continuously making pancakes, a metering device comprising a supply container having a discharge orifice at the bottom thereof, a plurality of griddles arranged for moving below said container to receive pancake batter therefrom, a plate movable with said griddles in sliding contact with the bottom of said container and having a plurality of openings of limited extent movable directly under the orifice, whereby pancake batter will be delivered to one of said griddles when an opening is aligned with the orifice and will be held in said container at all other times, a heating element associated with said griddles for heating the batter and means to cause relative motion between said griddle and said heating element.

3. In an apparatus for continuously making pancakes, a metering device comprising a supply container having a discharge orifice at the bottom thereof, a plurality of griddles arranged for moving below said container to receive pancake batter therefrom, a plate movable with said griddles in sliding contact with the bottom of said container and having a plurality of openings of limited extent movable directly under the orifice, whereby pancake batter will be delivered to one of said griddles when an opening is aligned with the orifice and will be held in said container at all other times, heating elements disposed on both sides of said griddles and means for moving said griddles between said heating elements.

JOSEPH F. KANE.

REFERENCES CITED

The following references are of record in the file of this patent:

UNITED STATES PATENTS

| Number | Name | Date |
| --- | --- | --- |
| Re. 19,685 | Brand | Sept. 3, 1935 |
| 1,009,924 | Moores | Nov. 28, 1911 |
| 1,310,495 | Ford | July 22, 1919 |
| 1,339,662 | Morgan | May 11, 1920 |
| 1,440,786 | Lyons | Jan. 2, 1923 |
| 1,631,655 | Sunderland et al. | June 7, 1927 |
| 1,666,335 | Lentz | Apr. 17, 1928 |
| 1,755,699 | Loehr | Apr. 22, 1930 |
| 1,776,501 | Grady | Sept. 23, 1930 |
| 1,844,339 | Shaw | Feb. 9, 1932 |
| 1,847,752 | Coleman | Mar. 1, 1932 |
| 1,868,287 | Haeringer | July 19, 1932 |
| 1,869,539 | Brand | Aug. 2, 1932 |
| 1,881,126 | Parr | Oct. 4, 1932 |
| 1,993,609 | Kennedy | Mar. 5, 1935 |
| 2,032,272 | Feltman | Feb. 25, 1936 |
| 2,033,178 | Brand et al. | Mar. 10, 1936 |
| 2,078,641 | Spencer | Apr. 27, 1937 |
| 2,112,309 | Santillan | Mar. 29, 1938 |
| 2,142,390 | Zerr | Jan. 3, 1939 |
| 2,168,773 | Parr | Aug. 8, 1939 |
| 2,238,309 | Cramer | Apr. 15, 1941 |
| 2,369,274 | Beatty | Feb. 13, 1945 |
| 2,433,054 | Lime | Dec. 23, 1947 |
| 2,514,977 | Tatosian | July 11, 1950 |